United States Patent [19]
Endo et al.

[11] Patent Number: 5,276,830
[45] Date of Patent: Jan. 4, 1994

[54] TWO LEVEL INDEXING METHOD FOR ACCESSING DATA BLOCKS HAVING FIRST POINTER TO SINGLE LOCATION CONTAINING SECOND POINTERS TO THE DATA BLOCKS

[75] Inventors: Koichiro Endo, Osaka; Yoshihiro Mori, Hirakata; Kisoko Suzuki, Neyagawa; Hidemasa Kitagawa, Toyonaka; Tetsuo Tomimoto, Ibaraki, all of Japan

[73] Assignee: Matsushita Electric Industrial Co., Ltd., Osaka, Japan

[21] Appl. No.: 500,544

[22] Filed: Mar. 28, 1990

[30] Foreign Application Priority Data

Mar. 28, 1989 [JP] Japan .................................. 1-77561
Oct. 13, 1989 [JP] Japan ................................ 1-266485

[51] Int. Cl.⁵ ...................... G06F 12/02; G06F 12/00
[52] U.S. Cl. .................................. 395/425; 395/800; 395/600; 364/245; 364/245.1; 364/245.2; 364/246.3; 364/254.3; 364/260.7; 364/DIG. 1; 364/957.1; 364/966.4; 364/968; 364/970.2
[58] Field of Search ................... 395/425, 800, 600

[56] References Cited

U.S. PATENT DOCUMENTS

4,580,211 4/1986 Doki et al. .......................... 395/425
4,660,130 4/1987 Bartley et al. ...................... 395/400

FOREIGN PATENT DOCUMENTS

165382 12/1985 European Pat. Off.

OTHER PUBLICATIONS

IBM Technical Disclosure Bulletin, vol. 21, No. 9, Feb. 1989, New York, US pp. 3798–3800, Gibbard, Walker "Efficient Storage Space Utilization".

*Primary Examiner*—Thomas C. Lee
*Assistant Examiner*—Paul Harrity
*Attorney, Agent, or Firm*—Wenderoth, Lind & Ponack

[57] ABSTRACT

Mass data is managed as data files in a mass data storage device. Each data file is formed or plural data blocks. Upon editing of a data file, the data content of each data block forming the file is examined. If the data content of a data block is less than a predetermined value, data from one or more adjacent data blocks is extracted and placed in the one data block so that the data content thereof will be at least the predetermined constant value. In this manner, the data content of blocks forming a file is maintained at or above a predetermined level.

4 Claims, 9 Drawing Sheets

TWO LEVEL INDEXING METHOD FOR ACCESSING DATA BLOCKS HAVING FIRST POINTER TO SINGLE LOCATION CONTAINING SECOND POINTERS TO THE DATA BLOCKS

BACKGROUND OF THE INVENTION

The present invention generally relates to a file management apparatus and method for managing as a data file a large amount of information, such as picture data or audio data, to effect an editing operation.

In recent years, the information processing system has been used in the processing of digital audio data and digital moving picture data. As such, the need has arisen to manage such a large quantity of data as a computer file to facilitate high speed editing of the data.

It is particularly desired that the data management apparatus and method be capable of managing the data in a processable form at a high speed.

The conventional embodiment of the above described data management apparatus and method will be described hereinafter with reference to the FIGS. 8 and 9.

FIG. 8 is a conceptual diagram of the conventional data management apparatus.

Referring to FIG. reference numeral 21 denotes a storage means for storing the data, reference numeral 22 denotes an input-output means for inputting and outputting the data into and from the storage means 21, and reference numeral 23 denotes a management means for managing the data stored in the storage means 21 via the input-output means 22. Reference numeral 24, located within the management means 23, denotes a data management means for dividing the memory areas in the storage means 21 into a plurality of blocks of constant size and for managing each block, and reference numeral 25 denotes a block management means for managing a plurality of blocks as one file.

The operation of the conventional data management apparatus as configured above and the conventional data management method will now be described.

The data management means 24 within the management means 23 manages adjacent memory areas in the storage means 21 as a block. The block management means 25 obtains for the respective blocks storage location information in the storage means 21 from the data management means 24, and manages logical concatenation information so that one file may be configured of a plurality of blocks.

When an access operation is effected to output one file, the management means 23 first refers to the block concatenation information for each of the files managed by the block management means 25. Then, information denoting the location within the storage means 21 of the respective blocks is obtained from the data management means 24 to drive the input-output means 22 to sequentially access the respective blocks stored in the storage means 21, so that the data of each block configuring the file from the storage means 21 may be sequentially outputted.

FIG. 9 is a diagram showing the relationship between the data management information of the management means 23 and the data of the storage means 21. The operation of the management means 23 will now be described.

In FIG. 9, reference numeral 21 denotes a storage means for storing the data, reference numeral 26 denotes a system memory for storing information for effecting the data management, reference numeral 27 denotes one file in the storage means 21 composed of data blocks 27a, 27b and 27c. Reference numeral 28 denotes a data block address storage part, which is located in the system memory 26, storing the storage means addresses of the data blocks 27a, 27b, 27c configuring the file 27. The block management means 25 obtains the address denoting the storage location of the data blocks 27a through 27c from the data management means 24 and respectively stores them at the elements 28a, 28b, 28c of the data block address storage part 28.

The management means 23 reads respectively from the composing elements 28a, 28b, 28c of the data block address storage part 28 the storage means 21 addresses of the data blocks 27a, 27b, 27c configuring the file 27. The management means 23 may manage the file 27 through accessing of the storage means 21 in accordance with read address information, number information and sequential information thereof.

The editing of the file will now be described by way of an example of the depletion of a data block from the file. When the data block 27b is deleted from the file 27, the management means 23 deletes the element 28b storing the address of the data block 27b from the data block address storage part 28 so as to write the address of the data block 27c stored in the element 28c into the element 28b of the data block address storage part 28. The data block 27b is deleted from the file 27 in this manner.

However, in such a method as described above, in a worst case all the elements 28a, 28b, 28c constituting the data block address storage part 28 must be rewritten in the editing operation of the file. When the number of the data blocks constituting the file 27 increases, such editing operations can severely hamper the processing speed of the system, thus creating a problem in that the demand for high speed editing of a mass file cannot be satisfied.

SUMMARY OF THE INVENTION

Accordingly, an object of the present invention is to provide an apparatus and a method for digital data management, which is adapted to manage computer mass data files to be processed without interruption upon input and output operations so as to easily obtain high speed processing.

In accomplishing this and other objects, the present invention is composed of a storage means for storing data, an input-output means for inputting and outputting the data with respect to the storage means, and a management means for managing the data of the storage means. The management means is composed of a data management means which manages adjacent areas in the storage means as data blocks and which also divides the interior of each block into a plurality of areas to manage them, a block management means which manages according to concatenation information one or more blocks stored in the memory means, and a regulation means which receives the information about the concatenation status of plurality of blocks and the internal status of each block from the data management means and the block management means to drive the input-output means for moving one or all portions of the data of one block from another block in the storage means.

In accordance with the above, the data management means manages the adjacent areas in the storage means as data blocks, and further, divides each block interior into data storage areas and empty areas to manage them. The block management means receives the information regarding storage locations of the blocks in the storage means from the data management means, and manages the concatenation information so as to configure one file from one or more blocks. Further, the regulation mean investigates the size of the data storage area of a block from the data management means. If the size of the data memory area of the block is smaller than a predetermined value, information regarding storage location in the storage means of the adjacent blocks used to configure the file is received from the block management means, and also, information is received regarding the size of the data storage areas and the empty areas of the adjacent blocks from the data management means. Thereafter, the regulation means drives the input-output means so as to move onto the block one or all portions of the data from one or more adjacent blocks, so that the size of the data storage area within the block may be normally regulated to at least the predetermined constant value which is determined by the performance of the storage means and the input-output speed of the data in the input-output means, and which is sufficient to effect real-time sequential data inputting and outputting operations in the input-output means.

This makes it possible to provide an apparatus and a method for digital data management which are adapted to manage on a computer mass data as files to be processed without interruption upon input-output operations so as to easily effect the processing operation at a high speed.

As described hereinabove, an apparatus and a method of digital data management of the present invention, which makes it possible to input and output the data without interruption upon input-output operations by the management, into the constant value of a proper size, of the data storage area within the block using the regulation means.

Also, since the existence of empty areas is allowed within the block managed by the data management means, the increase and decrease of the data to be caused by the editing of a file may be easily absorbed simply by the change in one portion of the file, thus making it possible to process even mass data at high speed without any requirement of the regular data rearrangement.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
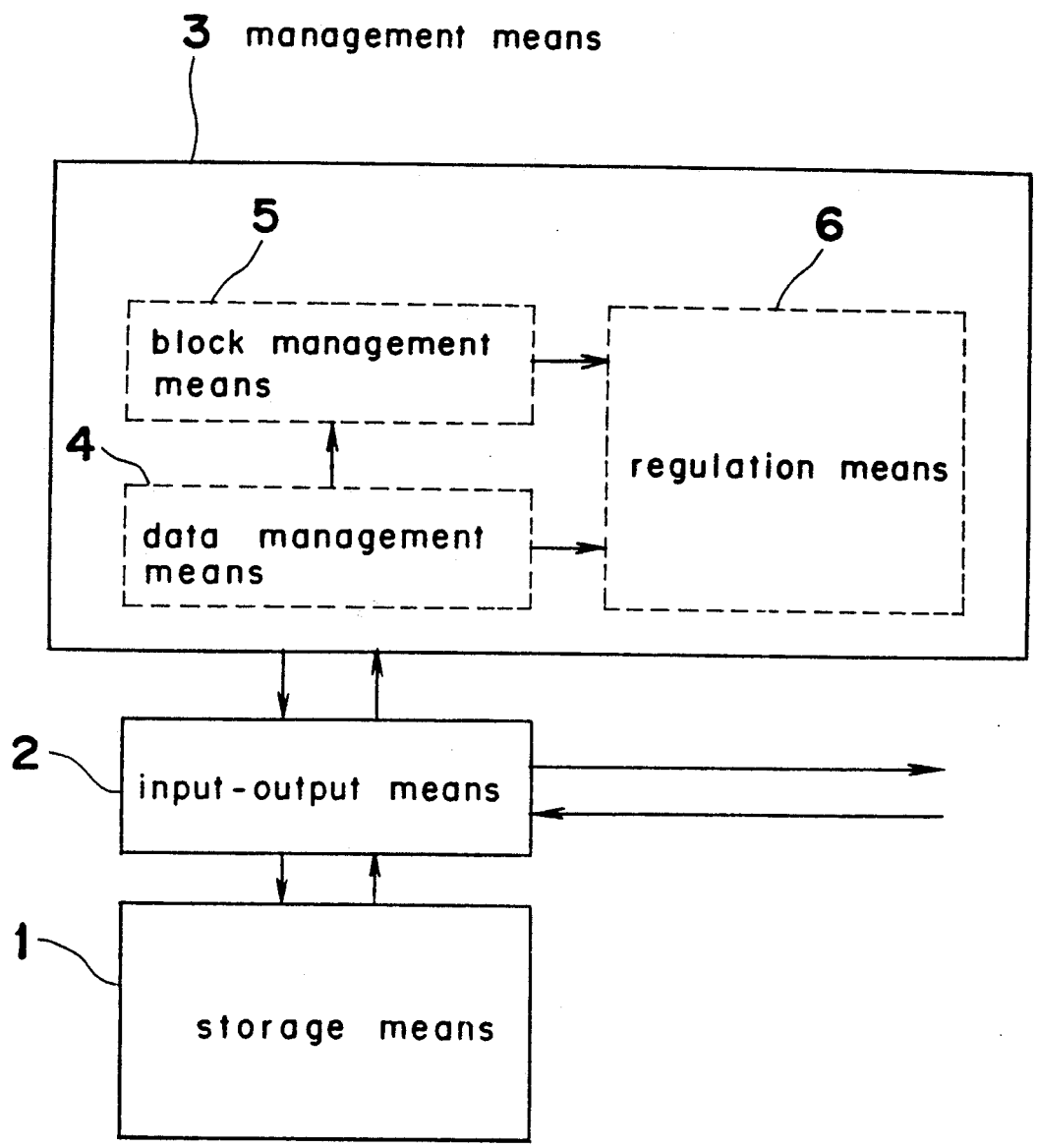
FIG. 1 is a construction conceptual diagram for illustrating an apparatus and a method for digital data management in one embodiment of the present invention.

Before the description of the present invention proceeds, it is to be noted that like parts are designated by like reference numerals throughout the accompanying drawings.

An apparatus and a method for digital data management in one embodiment of the present invention will be described hereinafter with reference to the drawings.

FIG. 1 is a conceptual diagram showing the configuration of the data management apparatus in one embodiment of the present invention.

In FIG. 1, reference numeral 1 denotes a storage means for storing data, reference numeral 2 denotes an input-output means for inputting and outputting the data of the storage means 1, and reference numeral 3 denotes a management means for managing the data in the storage means 1 via the input-output means 2. Reference numeral 4 denotes a data management means for managing the data in the storage means 1 as a plurality of data blocks of a constant size, reference numeral 5 denotes a block management means for managing a plurality of data blocks as one file, and reference numeral 6 denotes a regulation means which is adapted to receive information from the data management means 4 and the block management means 5, and to control the input-output means 2 to access the data of logically adjacent blocks.

Figure 2:
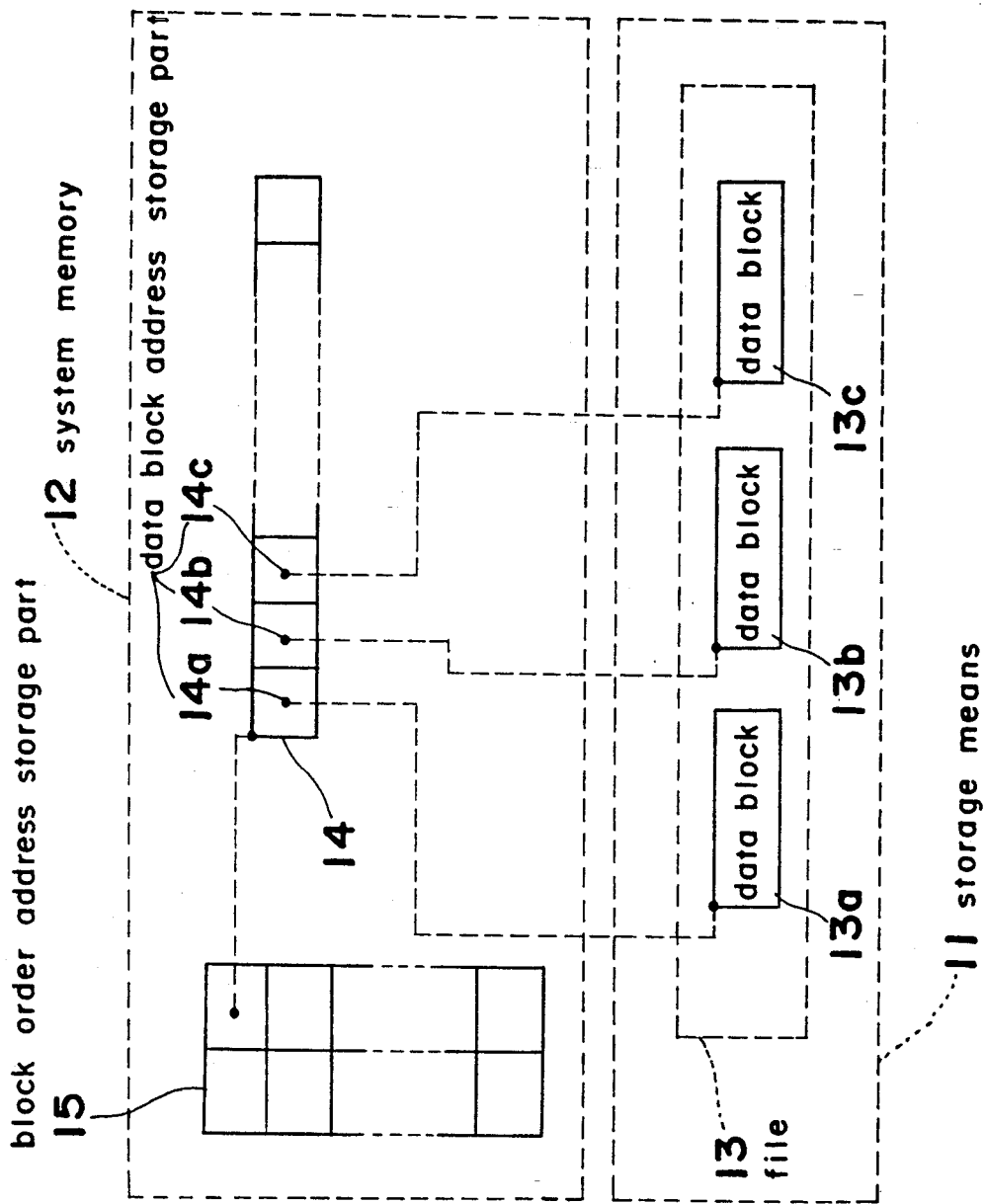
FIG. 2 is a diagram showing the relationship between management information of the management means and information stored in the storage means.

FIG. 2 is a diagram showing the relationship between management information of the management means 3 and information stored in the storage means 1.

In FIG. 2, reference numeral 11 denotes a storage means for storing the data as files, reference numeral 12 denotes a system memory for storing information used by the management means 3 to manage the data files, and reference numeral 13 denotes one file in the storage means 11 composed of data blocks 13a, 13b and 13c. Reference numeral 14 denotes a block order storage part, located in the system memory 12, in which the block management means 5 stores the order of the data blocks 13a, 13b, 13c configuring the file 13 stored in the storage means 11, reference numerals 14a, 14b, 14c denotes data blocks address storage parts in which the data management means 4 stores the storage means 11 addresses of the data blocks 13a, 13b, 13c, and references numeral 15 denotes a block order address storage part in which the block management means 5 stores the system memory 12 addresses of the block order storage part 14 and the number of the data block order address storage parts constituting the block order storage part 14.

In accordance with the construction as described hereinabove, a method of managing the data as files in block units to be managed by the data management means 4 will be described.

First, the management means 3 reads the addresses in the system memory 12 of the block order storage part 14 and the number of data block address storage parts constituting the block order storage part 14 from the block order address storage part 15 using the block management means 5. Then, the block order storage part 14 is accessed in accordance with the address of the read block order storage part 14 so as to read the addresses of the data blocks 13a, 13b, 13c in the storage means 11 from the data block address storage parts 14a, 14b, 14c within the block order storage part 14. The order of the data blocks configuring the file 13 is the same as the order of the data block address storage parts 14a, 14b, 14c stored in the block order storage part 14.

In this manner, the system may identify the storage means 11 addresses of the data blocks 13a, 13b, 13c configuring the file 13 and the order of the data blocks constituting the file 13, and may thus manage the file 13 in the storage means 11.

A method of editing a block unit of the digital data will now be described.

Figure 3:
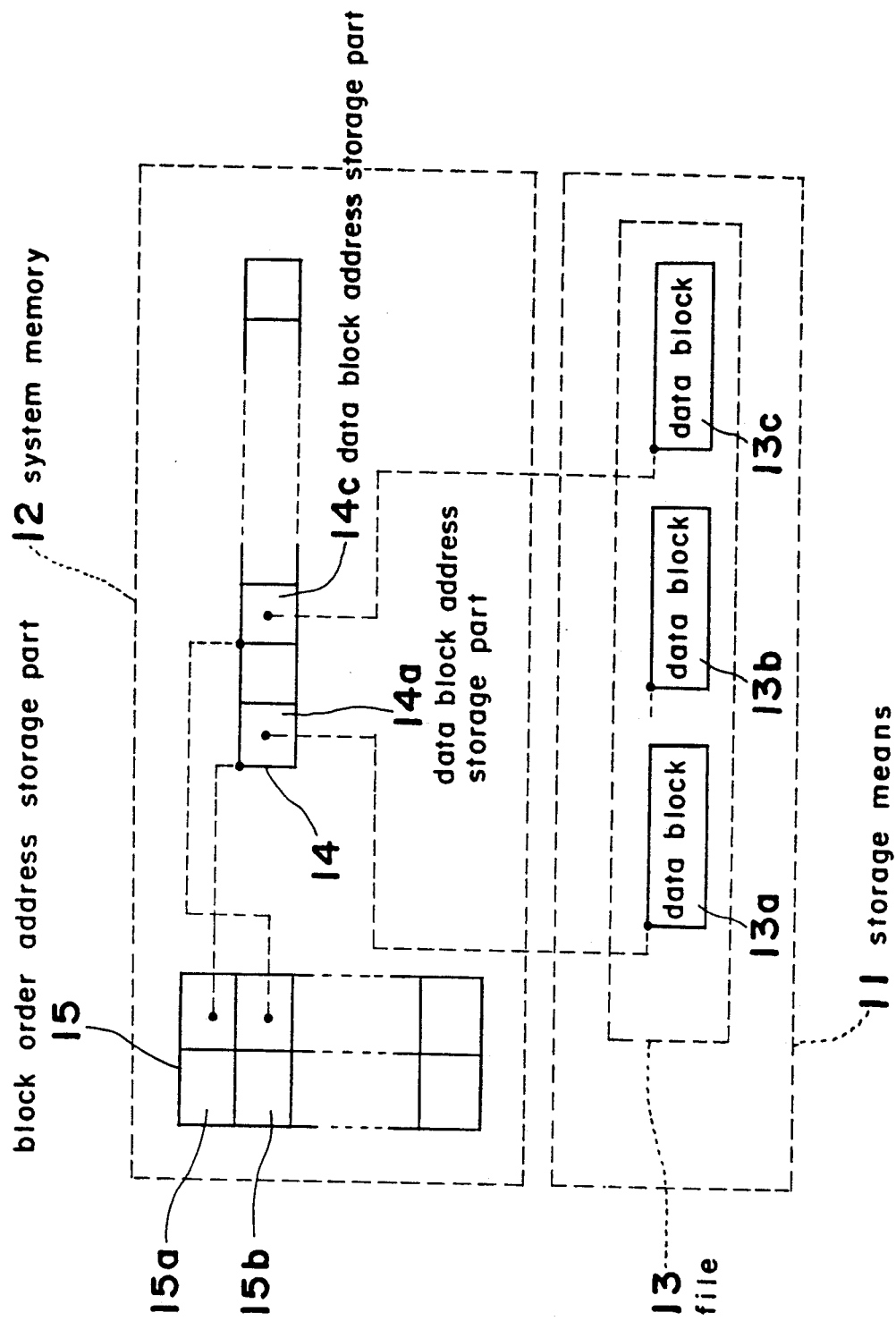
FIG. 3 is a conceptual diagram for illustrating the file editing method of the present invention.

FIG. 3 shows a conceptual diagram after the deleting and editing operations have been effected so as to illustrate a method of editing the data file.

In FIG. 3, reference numerals 11 through 15 are the same as those of FIG. 2. Reference numeral 15a denotes a first element of the block order address storage part 15, and reference numeral 15b denotes a second element of the block order address storage part 15.

An explanation will be effected by way of an example, where the data block 13b is deleted from the file 13.

In order to delete the data block 13b from the file 13, first, the number of the data block address storage parts in the block order storage part 14, which is stored in the first element 15a of the block order address storage part 15, is changed from three to one. Then, the system memory 12 address of the data block address storage part 14 storing the address of the data block 13c is stored in the second element 15b of the block order storage part 15, and also, the number of the data block address storage parts is stored as one. The deletion editing is completed.

The accessing operation into the file with the editing being completed in this manner is performed as follows. First, the management means 3 reads the first system memory 12 address stored in the block order storage part 14 and the number of the data block address storage parts constituting the block order storage part 14 from the first element 15a of the block order address storage part 15 using the block management means 5. Also, the management means 3 reads the second system memory 12 address stored in the block memory 14 and the number of the second data block address storage part constituting the block order storage part 14 from the second element 15b of the block order address storage part 15 using the block management means 5.

Then, in accordance with the first address of the read block order storage part 14, the block order storage part 14 is accessed through the block management means 5, and reads the address of the data block 13a in the storage means 11 from the data block address storage part 14a within the block order storage part 14. Further, in accordance with the second address of the read block order storage part 14, the block order storage part 14 is accessed through the block management means 5, and reads the address of the data block 13c in the storage means 11 from the data block address storage part 14c within the block order storage part 14. The order of the data blocks configuring the file 13 is the same as the order of the data block address storage parts to be read from the block order address storage part 15 and the block order storage part 14.

In this manner, the management means 3 may identify the storage means 11 addresses of the data blocks 13a, 13c configuring the file 13, and the order of the data blocks configuring the file 13, and may thus manage the file 13 after the deleting and editing operations have been effected in the storage means 11.

A method of managing the data by much smaller units than the block units using the data management means 4 will now be described.

Figure 4:
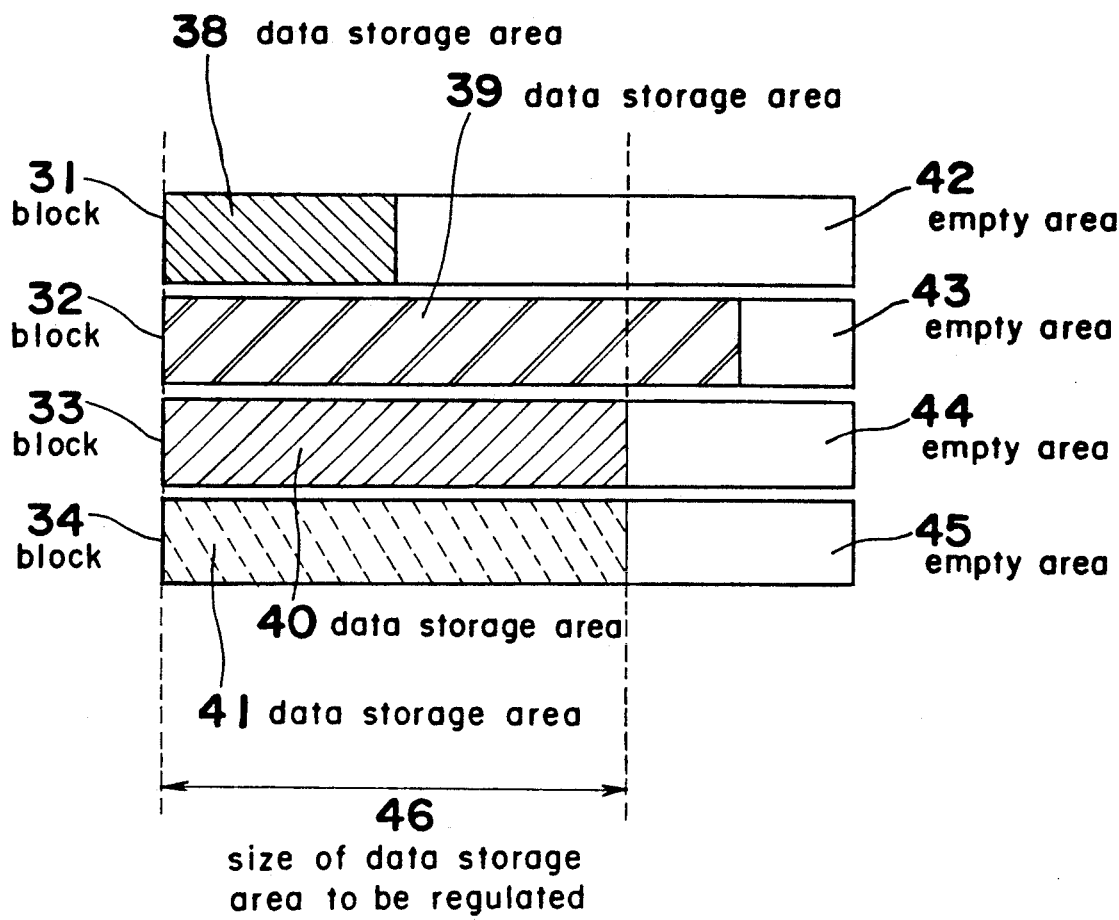
FIGS. 4(a) and (b) are conceptual views for illustrating the blocks managed according to one embodiment.
Figure 4:
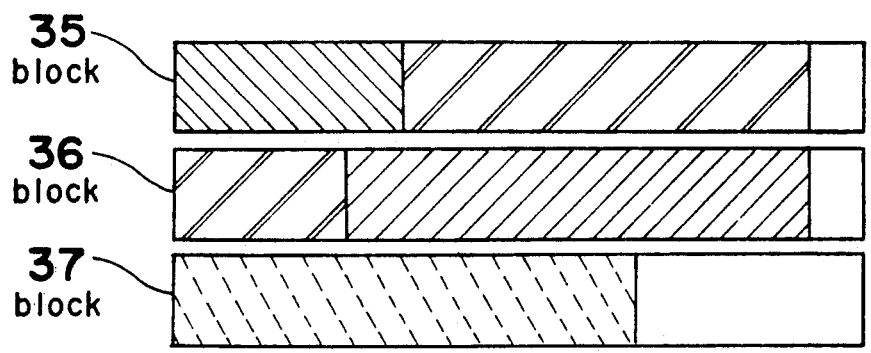

FIGS. 4(a) and (b) show conceptual views of a plurality of blocks configuring one portion of the file on the storage means 1 of FIG. 1.

In FIGS. 4(a) and (b), reference numerals 31 through 34 and reference numerals 35 through 37 respectively denote discrete blocks arranged in the storage means 1. They are logically adjacent each other to configure one portion of the file. Each data block is divided internally into a plurality of areas, the various hatched portions identified by reference numeral 38 through reference numeral 41 show such data storage areas having data stored therein, and the blank portions identified by reference numeral 42 through reference numeral 45 show empty areas not having data stored therein. Reference numeral 46 shows the size of the data storage area in which the regulation means 6 effects the regulating operation into a constant value.

Figure 5:
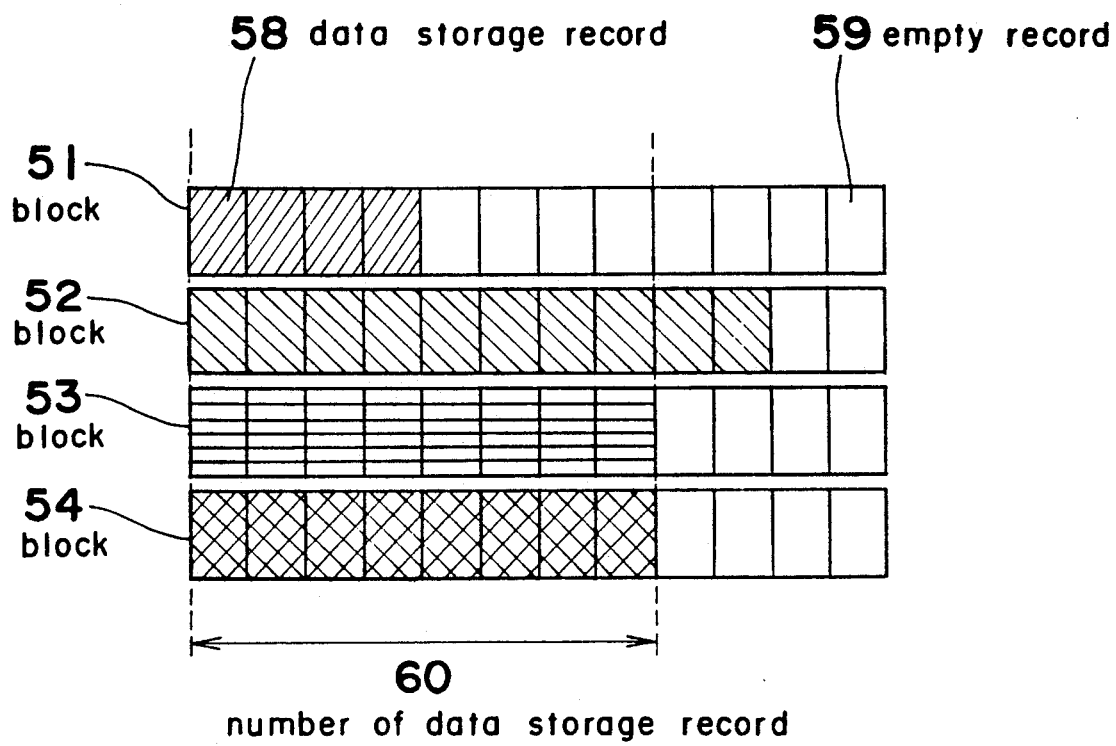
FIGS. 5(a) and (b) are conceptual views for illustrating the blocks managed according to another embodiment.
Figure 5:
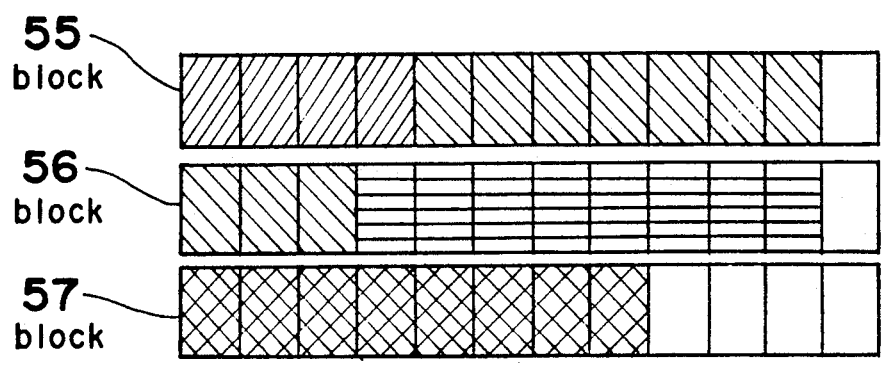

FIGS. 5(a) and (b) show other conceptual views of a plurality of blocks configuring one portion of a file in the storage means 1 of FIG. 1.

In FIGS. 5(a) and (b), reference numerals 51 through 54 and reference numerals 55 through 57 denotes blocks each being arranged discretely in the storage means 1, and logically adjacent each other to constitute one portion of a file. The interior of the block is divided into a plurality of records. A data storage record which is hatch as identified by reference numeral 58 has a record stored therein, and a data storage record which is blank as identified by reference numeral 59 is empty. Reference numeral 60 show the number of the data storage record in which the regulation means 6 effects the regulating operation into the constant value.

The operation of the data management apparatus of the present invention and the method for data management will now be described with reference to FIGS. 1, 4(a), 4(b) and 6.

The data management means 4 within the management means 3 manages the adjacent areas in the storage means 1 as blocks, conceptually shown as the block 31 through the block 34 of FIG. 4(a).

The data management means 4 further divides the interior of the block logically into data storage areas and empty areas to manage them. The block 31 shows an example where the block interior is divided into a data storage area 38 having data stored therein and an empty area 42 not having data stored therein. In this diagram, although the data storage area starts from the head of the block, it may start from the halfway point of the block. Also, a plurality of data storage areas and empty areas may exist within the block.

Also, the size of the empty area may be zero.

The block management means 5 obtains information regarding the position in the storage mean of the respective block from the data management means 4, and manages the logical concatenation information to configure one file from one or a plurality of blocks.

Figure 6:
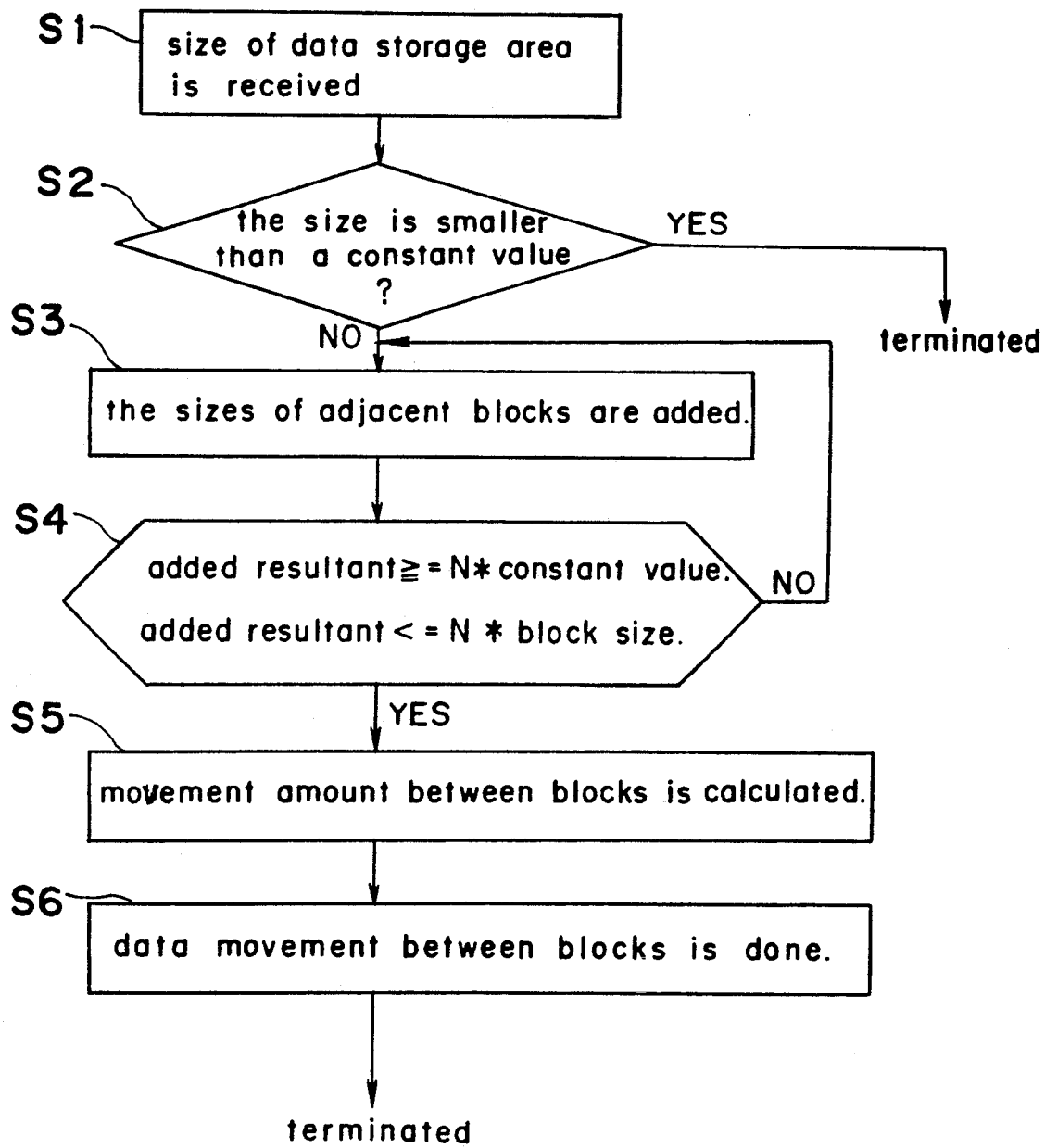
FIG. 6 is a flow chart showing one example of the operation of the regulation means in the present invention.

FIG. 6 shows one example of the operation flow of the regulation means 6.

The regulation mean 6 receives information regarding the size of the data storage area of one block from the data management means 4 (Step S1). If the size of the data management area of the block is smaller than the constant value (Step S2), the information of the adjacent blocks configuring the file is obtained from the block management mean 5, and information regarding the size of the data storage area and the empty area of the adjacent blocks from the data management means 4. Thereafter, the regulations means 6 drives the input-output means 2 so that one portion or all portions of the data may be moved into the block from one or more adjacent blocks so as to normally regulate the size of the data storage area within the block into at least a constant value.

Now, assume that the size of a block is 16 k byte and the constant value of the size of the data storage area within the block the regulation means 6 is set to 12 k byte. FIG. 4(a) shows a condition where a block having a data storage area which is smaller than the constant value has been caused by a change in the file. The size of the data storage area of the block 31 is 4 k byte, the size of the data storage area of the block 32 is 14 k byte, the size of the data storage area of the block 33 is 12 k byte, and the size of the data storage area of the block 34 is 12 k byte. Since the data storage area of the block 31 is 4 k byte and is less than the established constant value, the regulation means 6 obtains information about the logically adjacent block 32 from the data management means 4 and the block management means 5. The regulation means 6 adds the size of the data storage area of the adjacent block (Step n3), and sequentially examines the remaining adjacent blocks until the addition result become larger than a multiple of the established constant value and smaller than a multiple of the block size (Step n4). In the example shown in FIG. 4(a), the addition result of the data storage area sizes when the examination is effected up to an including block 33 becomes 4 k+14 k+12 k=30 k, which is larger than 12 k×2=24 k and smaller than 16 k×2=32 k. The regulation means 6 moves 11 k byte of data from the block 32 to the block 31 to constitute the block 35 of FIG. 4(b). Also, 12 k byte of data is moved from the block 33 to the block 32 to constitute the block 36. The changing or moving of data is not required after the block 34. In this manner, the regulation means 6 changes a plurality of blocks shown in FIG. 4(a) to those shown in FIG. 4(b) so that the size of the data storage area within each block is at least the constant value (Steps n5 and n6).

The operation of the apparatus for digital data management and a method for digital data management in another embodiment of the present invention will be described with reference to FIGS. 1, 5(a), 5(b) and 7.

The data management means 4 within the management means 3 manages the adjacent areas in the storage means 1 as blocks shown conceptually in FIGS. 5(a) and 5(b) as blocks 51 through 57.

The data management means 4 further divides the interior of each block into one or more data storage records 58 and into zero or more empty records 59 so as to manage them.

Although fixed length records are shown, the records may be variable length. Also, the data storage records may start from the halfway point of the block, and need not be located adjacent each other within the block.

The block management means 5 obtains information regarding the position in the storage means 1 of each block from the data management means 4 so as to manage the logical concatenation information so that one file may be configured from one or a plurality of blocks.

Figure 7:
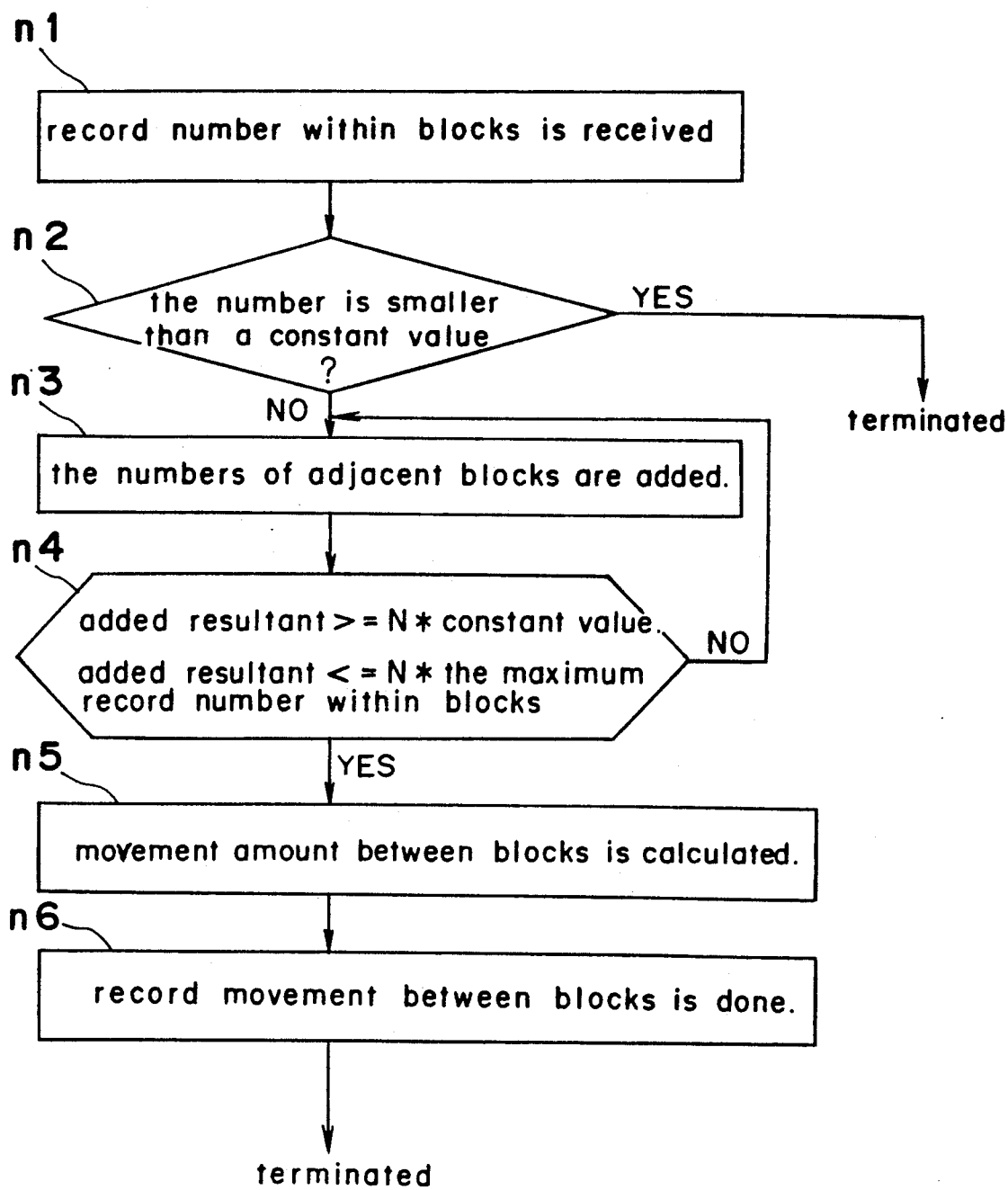
FIG. 7 is a flow chart showing another example of the operation of the regulation means for the present invention.
Figure 8:
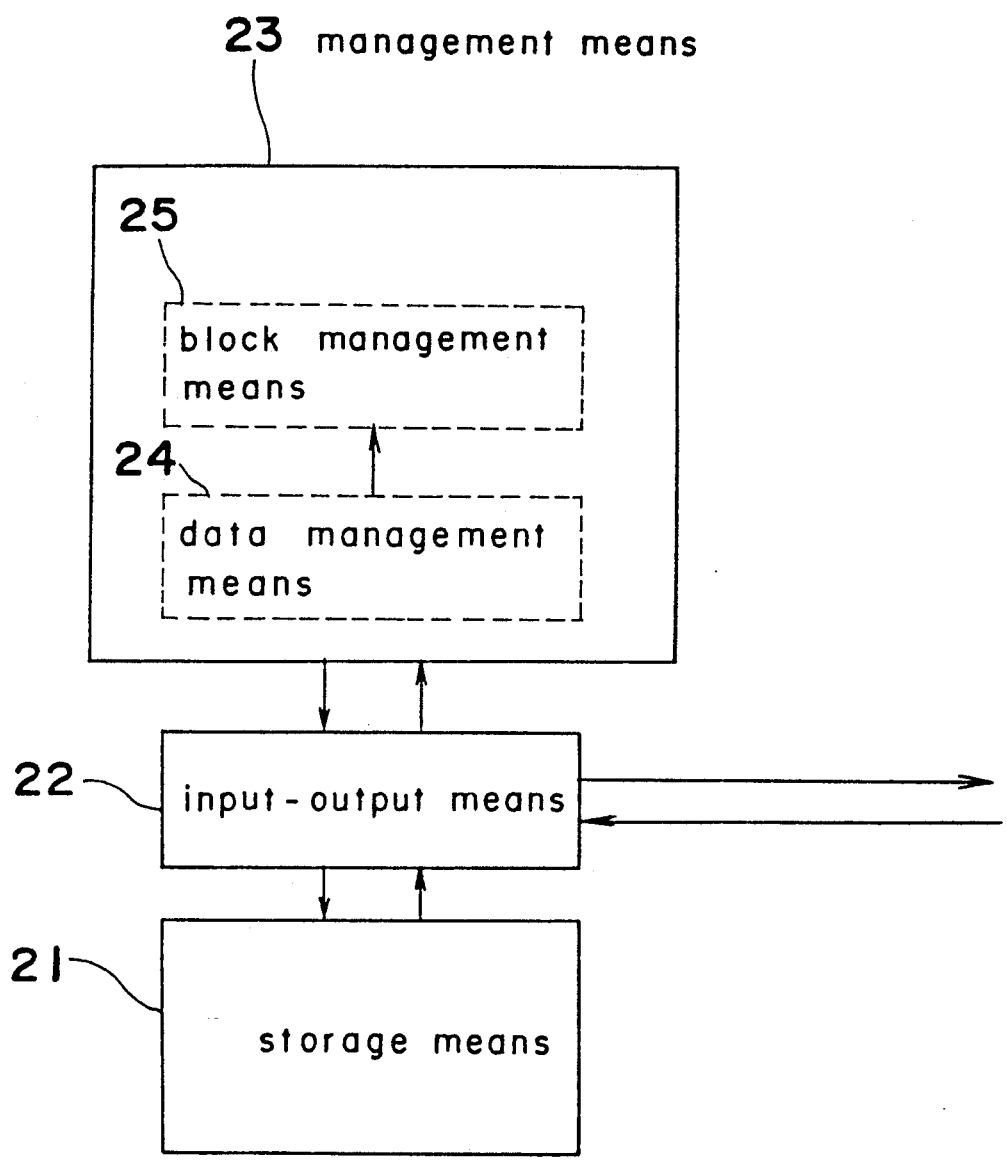
FIG. 8 is a construction conceptual diagram for illustrating the conventional apparatus and method for digital data management.
Figure 9:
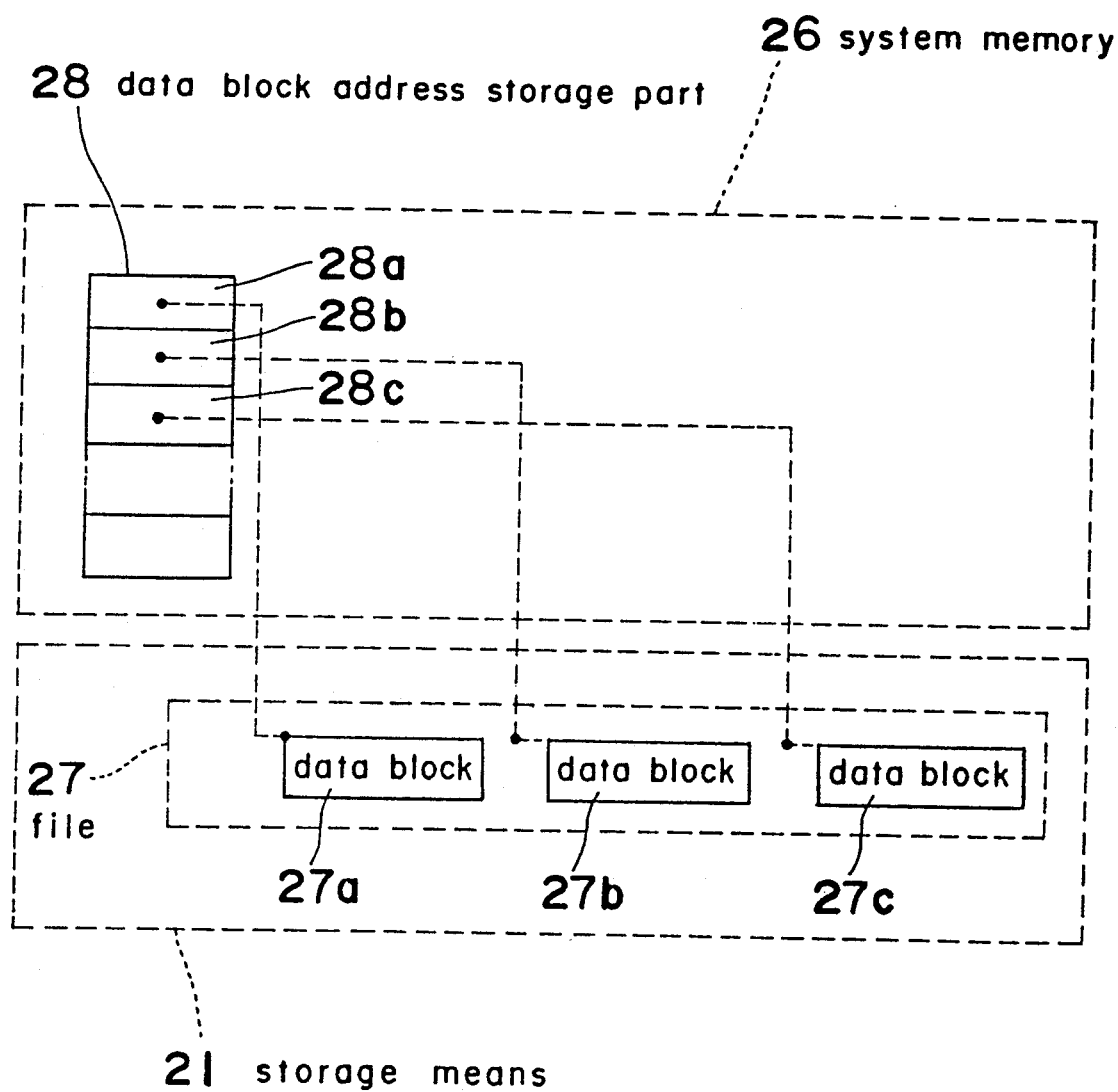
FIG. 9 is also a diagram showing the relationship between management information of the conventional management means and information stored in the storage means.

FIGS. 7 shows another example of the operation flow of the regulation means 6.

The regulation means 6 receives the information regarding the number of data storage records of one block from the data management means 4 (Step n1) and compares the number of data storage records with a constant value (Step n2). If the number of the data storage records of the block is smaller than the constant value, information regarding the adjacent blocks configuring the file may be obtained from the block management means 5 and information about the number of the data storage records and the empty records of the adjacent blocks from the data management means 4. Thereafter, the regulation means 6 controls the input-output means 2 so as to move records into a block from one or more adjacent blocks so that the number of data storage records within the block is normally regulated into at least the constant value.

Now, assume that the record number capacity within each block is 12, and the constant number of the data storage records within each block is set to eight records. FIG. 5(a) shows a condition where a block having a number of data storage records which is less than the constant value has been caused by a change in the file. The number of data storage records of the block 51 is 4, the number of data storage records of the block 52 is 10, the number of data storage records of the block 53 is 8, and the number of data storage records of the block 54 is 8.

Since the number of data storage records of the block 51 is 4 and is less than the predetermined constant value 8, the regulation obtains information regarding the logically adjacent block 52 from the data management 4 and the block management means 5. The regulation means 6 sequentially examines the remaining adjacent blocks (Step n3) until the sum of data storage records of the adjacent blocks is larger than the multiple of the determined constant value and smaller than the multiple of the block size. In the example, when the examination is effected up to and including block 53, the sum of the number of data storage records becomes 4+10+8=22, which is larger than 8×2=16, and smaller than 12×2=24. The regulation means 6 moves the data of seven records from the block 52 to the block 51 to constitute the block 55 shown in FIG. 5(b). Also, eight records are moved from the block 53 to the block 52 to constitute the block 56. Such changing or moving of records is not effected after the block 54. In this manner, the regulation means 6 changes a plurality of blocks shown in FIG. 5(a) to those shown in FIG. 5(b) so as to effect the regulating of the number of data storage records within each block to become at least the constant value.

When the block interior has been divided into a plurality of fixed length records, the data movement unit between the blocks is limited to records, but the amount of information managed by the data management means 4 will lessen.

A secondary storage apparatus, which is generally used, such as magnetic disk, optical disk or the like, will be used for the storage means 1, 11. Although these apparatuses require seeking upon access into each block, the data amount within the block is managed at the constant value of the proper size by the regulation means 6. As the proper size, for example, a buffer of two block portions is provided on the input-output means 2 so that the data may be inputted and outputted without interruption upon the input-output operations.

Although the size of the data storage area within the block to be regulated by the regulation means 6 and the number of data storage records, namely, the data amount within the block, may be optionally set, it may also be determined according to the performance specifications of the storage means 1, 11, and according to the necessary data output speed as in the equation (1), $$Lb = Vo \cdot Vr \cdot Ta/(Vr - Vo) \quad (1)$$

wherein Lb is a size (byte) of the data storage area, Vo is a data output speed, Vr is a disk transfer speed (byte/second), Ta is a disk access time (second).

When a standard magnetic disk having a 52 ms disk access time and 960K byte disk transfer speed is to be used for the storage means 1, 11, and 170K byte/second is required in the continuous output speed of the data from the input-output means 2, the size of the data storage area will do if it is 11K byte or more.

In the present embodiment, although the data of one block is inputted and outputted at one access into the storage means 1, 11, two or more blocks may be inputted and outputted.

Also, in the apparatus and the method for digital data management of the present invention as the existence of the free area is allowed within the block managed by the data management means 4, the increase and the decrease of data caused by the editing of the file ma be easily absorbed simply by the change in the one portion of the file, and the data is not required to be periodically arranged.

The size of the data storage area of the block which is less than the constant value in the data storage area is assumed to be Eo, the size of the data storage area of the blocks logically adjacent to the block are E1, E2, ... Ej, with the addition of them being represented by Sj. Assume that the constant value to be regulated by the regulation means 6 is Rmin, the block size is Rmax, and the size of the data storage area within all the blocks has only to be Rmin or more and to be Rmax or less. If the minimum j which satisfies the equation (2) is obtained, the number j+1 of the blocks necessary for the regulation of the block which is less than the constant value Rmin in the size of the data storage area may be obtained.

$$N \times Rmin \leq Sj \leq N \times Rmax \quad (2)$$

In the equation (2), N is an integer of 1 or more. Since $O < Rmin < Rmax$, and $O \leq SO < Rmin$, it is possible to prove the equation (3) from the equation (2).

$$j \leq Rmax/(Rmax - Rmin) \quad (3)$$

As the j which may be obtained from the size Rmin of the data storage area and the block size Rmax show a finite part from the equation (3), the regulation means 6 may retain the size of the data storage area of all the blocks at the constant value or more by the movement of the data from the block of the finite part.

Since the seek time into the next block does not have to be taken into consideration regarding the final block configuring the file, the size of the data storage area in this block may be lower than the constant value.

Also, the size of the data storage area to be regulated by the regulation means and the number of data storage records may be different for each file. In this case the block management means 5 retains this information.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A data management method comprising the computer implemented steps of:

managing, using data management means, each of a plurality of logically adjacent storage areas of a storing means respectively constituting a plurality of data blocks by storing addresses of the data blocks in plural respective data block address storage parts of a block order storage part;

managing, using block management means, at least one data block as a data file based on concatenation information of the at least one data block according to addresses stored in the block order storage part, and storing address information of the block order storage part containing the data block address storage parts and a number of the data block address storage parts of the block order storage part in a block order address storage part; and reading, using management means, the address information of the block order storage part containing the data block address storage parts and the number of the data block address storage parts of the block order storage part stored in the block order address storage part, accessing the block order storage part in accordance with the thus read information to obtain an address of a data block of the storing means, and accessing data in the storing means via an input-output means in accordance with the thus read address of the data block.

2. A data management method comprising the computer implemented steps of:

managing, using data management means, each of a plurality of logically adjacent storage areas of a storing means respectively constituting a plurality of data blocks by storing addresses of the data blocks in plural respective data block address storage parts of a block order storage part;

managing, using block management means, at least one data block as a data file based on concatenation information of the at least one data block according to addresses stored in the block order storage part, and storing address information of the block order storage part containing the data block address storage parts and a number of the data block address storage parts of the block order storage part in a block order address storage part; and editing, using management means, one of said data of the storing means by rewriting an address of the data block address storage parts of the block order storage part corresponding to said one data block to be stored in the block order storage part and the number of data block address storage parts of the block order storage part stored in the block order address storage part.

3. A data management method comprising the computer implemented steps of:

managing, using data management means, each of a plurality of logically adjacent storage areas of a storing means respectively constituting a plurality of data blocks by storing addresses of the data blocks in plural respective data block address storage parts of a block order storage part;

managing, using block management means, at least one data block as a data file based on concatenation information of the at least one data block according to addresses stored in the block order storage part, and storing address information of the block order storage part containing the data block address storage parts and a number of the data block address storage parts of the block order storage part in a block order address storage part;

reading, using management means, the address information of the block order storage part containing the data block address storage parts and the number of the data block address storage parts of the block order storage part stored in the block order address storage part, accessing the block order storage part in accordance with the thus read information to obtain an address of a data block of the storing means, and accessing data in the storing means via an input-output means in accordance with the thus read address of the data block; and editing, using management means, one of said data block of the storing means by rewriting an address of the data block address storage parts of the block order storage part corresponding to said one data block to be stored in the block order storage part and the number of data block address storage parts of the block order storage part stored in the block order address storage part.

4. A data management method comprising the computer implemented steps of:

managing, using data management means, each of a plurality of logically adjacent storage areas of a storing means respectively constituting a plurality of data blocks by storing addresses of the data blocks in plural respective data block address storage parts of a block order storage part, and identifying within each data block at least one data area having data stored therein and any empty areas not having data stored therein;

managing, using block management means, at least one data block as a data file based on concatenation information of the at least one data block according to addresses stored in the block order storage part, and storing address information of the block order storage part containing the data block address storage parts and a number of the data block address storage parts of the block order storage part in a block order address storage part;

receiving, using regulation means, concatenation information of the plural data blocks of the data file and information regarding a data size of the data areas within each data block of the data file and a data size of each data block of the data file, and for driving an input-output means to move data areas of one data block of the data file to another data block of the data file so as to maintain at least a predetermined constant data size of the combined data areas of each data block of the data file, the predetermined constant data size being determined based on performance characteristics of said storing means and a data input-output speed of said input-output means to effect real-time sequential data input-output operations;

reading, using management means, the address information of the block order storage part containing the data block address storage parts and the number of the data block address storage parts of the block order storage part stored in the block order address storage part, accessing the block order storage part in accordance with the thus read information to obtain an address of a data block of the storing means, and accessing data in the storing means via said input-output means in accordance with the thus read address of the data block; and editing, using management means, one of said data blocks of the storing means by rewriting an address of the data block address storage parts of the block order storage part corresponding to said one data block to be stored in the block order storage part and the number of data block address storage parts of the block order storage part stored in the block order address storage part.

* * * * *